United States Patent [19]
Matsuzaki et al.

[11] Patent Number: 4,535,127
[45] Date of Patent: Aug. 13, 1985

[54] POLYACETAL COPOLYMERS AND PROCESS FOR PRODUCTION THEREOF

[75] Inventors: Kazuhiko Matsuzaki; Minoru Hamada, both of Kurashiki, Japan

[73] Assignee: Asahi Kasei Kogyo Kabushiki Kaisha, Osaka, Japan

[21] Appl. No.: 588,971

[22] Filed: Mar. 13, 1984

[30] Foreign Application Priority Data

Mar. 23, 1983 [JP] Japan ................................ 58-47114
Jul. 12, 1983 [JP] Japan ............................... 58-126792
Aug. 15, 1983 [JP] Japan ............................... 58-147960

[51] Int. Cl.$^3$ ........................ C08F 8/28; C08L 61/02
[52] U.S. Cl. .................................. 525/154; 525/399; 525/400; 525/401; 525/427; 525/441; 525/456
[58] Field of Search ............... 525/154, 441, 427, 456, 525/399, 400, 401

[56] References Cited

U.S. PATENT DOCUMENTS

| 3,017,389 | 1/1962 | Laugsdorf, Jr. et al. | 260/67 |
| 3,218,295 | 11/1965 | Cline | 525/154 |
| 3,337,503 | 8/1967 | Schnizer et al. | 260/67 |
| 3,346,663 | 10/1967 | Kern et al. | 260/823 |
| 3,364,157 | 1/1968 | Halek et al. | 260/13 |
| 3,580,973 | 5/1971 | Kennedy, Jr. et al. | 525/441 |
| 3,872,182 | 3/1975 | Sextro et al. | 260/830 R |
| 3,925,505 | 12/1975 | Sextro et al. | 260/823 |
| 4,003,960 | 10/1977 | Radici et al. | 525/427 |
| 4,277,577 | 7/1981 | Burg et al. | 525/154 |

FOREIGN PATENT DOCUMENTS

| 229035 | 8/1963 | Fed. Rep. of Germany. |
| 2062735 | 7/1971 | Fed. Rep. of Germany. |
| 1745698 | 11/1972 | Fed. Rep. of Germany. |
| 1380681 | 1/1975 | United Kingdom. |

Primary Examiner—Theodore E. Pertilla
Attorney, Agent, or Firm—Birch, Stewart, Kolasch & Birch

[57] ABSTRACT

A polyacetal copolymer composed of an acetal polymer portion and a thermoplastic elastomer portion having soft segments and hard segments, the second-order transition temperature of said elastomer portion being in the range of −120° to 40° C. A process for producing such a polyacetal copolymer is also described.

18 Claims, No Drawings

POLYACETAL COPOLYMERS AND PROCESS FOR PRODUCTION THEREOF

This invention relates to a novel polyacetal copolymer. More particularly, it relates to a novel polyacetal copolymers which is unprecedentedly excellent in impact resistance and fatigue resistance and to a process for producing the same.

Acetal polymers are generally produced by the homopolymerization of formaldehyde or trioxane or by the copolymerization of formaldehyde or trioxane with a cyclic ether.

U.S. Pat. No. 3,017,389 discloses a process for polymerizing formaldehyde in the presence of a low-molecular-weight chain transfer agent such as an alcohol, ester, acid anhydride, or amide. The polymer obtained by use of such a compound, however, is poor in impact resistance.

U.S. Pat. No. 3,218,295 discloses the polymerization of formaldehyde in the presence of polymers such as poly(tetramethylene glycol), vinyl acetate copolymers, and methyl methacrylate-vinyloxymethylmethylamine copolymers. The polyoxymethylene block copolymers produced by this method are improved in toughness to a certain degree but, on the other hand, lost markedly in strength due to an excessive pliability, as will become apparent from the Comparative Examples given later on.

In U.S. Pat. No. 3,337,503, there is described that in polymerization of trioxane, such compounds as methylal, methanol, formic acid, and acetic anhydride function as chain transfer agents. The polymers obtained by use of such compounds are also poor in impact resistance.

In U.S. Pat. No. 3,346,663, there is described the polymerization of trioxane in the presence of poly(ethylene glycol).

In U.S. Pat. No. 3,925,505, there is described the polymerization of trioxane in the presence of ethylene oxide-tetrahydrofuran copolymers.

U.S. Pat. No. 3,872,182 discloses a process for the polymerization of trioxane in the presence of a primary polymer such as poly(vinyl acetate).

The polymers obtained by the processes listed above are inferior in impact resistance, as will be seen from the Comparative Examples given later on and leave plenty of room for further improvement.

The present inventors carried out an extensive study about the molecular weight regulator to be used in polymerization and found that a certain specific elastomer functions as excellent molecular weight regulator and, as a consequence, found a polyacetal copolymer which surpasses conventional acetal polymers in both impact and fatigue resistances. Such a copolymer, moreover, is imparted with an improved toughness, while a high strength being retained. The copolymer of the present invention, therefore, is worthy of being called a highly-balanced polymer.

The present invention provides a novel polyacetal copolymer and a process for the production thereof, which comprises homopolymerizing formaldehyde or trioxane or copolymerizing a compound selected from formaldehyde, trioxane and polyoxymethylene with a cyclic ether in the presence of a thermoplastic elastomer having a soft segment, a hard segment, and at least one functional group selected from hydroxyl group, carboxyl group, carboxylic anhydride group and amino group, the second-order transition temperature (Tg, glass transition temperature) of said elastomer being in the range of $-120°$ to $40°$ C.

The present invention is described below in detail.

According to this invention, a thermoplastic elastomer having in the polymer molecule at least one functional group selected from hydroxyl group, carboxyl group, carboxylic anhydride group and amino group is employed as molecular weight regulator in the homopolymerization of formaldehyde or trioxane or the copolymerization of a compound selected from formaldehyde, trioxane and polyoxymethylene with a cyclic ether.

The elastomer which can be used according to the present invention is a thermoplastic polymer consisting of an amorphous segment (soft segment) of low second-order transition temperature and a segment (hard segment) forming a heat-reversible cross-linking structure, the second-order transition temperature of the elastomer being $-120°$ to $40°$ C. It is necessary, according to this invention, that the second-order transition temperature be in the range of from $-120°$ to $40°$ C. The impact resistance of the resulting polyacetal copolymer is improved to a large degree only when there is employed an elastomer having a second-order transition temperature in the range of $-120°$ to $40°$ C. Such an elastomer functions as molecular weight regulator in the polymerization to regulate molecular weight of the resulting polymer and, at the same time, is incorporated in the polymer as a macromer capable of forming a polymer block. When one functional group is present in the elastomer molecule, there is formed a diblock copolymer of the A-B type consisting of the elastomer (B) and polyacetal (A). When two functional groups are present, there is obtained a triblock copolymer of the A-B-A type. When three or more functional groups are present, a graft copolymer consisting of the elastomer as stem polymer and the polyacetal as branch polymer.

The thermoplastic elastomers suitable for use according to this invention are selected from the elastomers of the polyolefin type, elastomers of the polystyrene type, elastomers of the polyester type, elastomers of the polyamide type and elastomers of the polyurethane type.

The first group of suitable elastomers is of the polyolefin type which contains polyolefin as the hard segment. Elastomers of the polyolefin type are including (unsaturated compound)-modified ethylene-propylene copolymers and (unsaturated compound)-modified ethylene-propylene-diene terpolymers. Dienes used as termonomers to be copolymerized with ethylene and propylene include dicyclopentadiene, ethylidenenorbornene, methylenenorbornene and 1,4-hexadiene.

The ethylene-propylene copolymer (EPM) and ethylene-propylene-diene terpolymer (EPDM) can be modified in the presence or absence of peroxides with unsaturated compound including carboxylic acid anhydride such as maleic anhydride, methylmaleic anhydride, itaconic anhydride, citraconic anhydride, phthalic anhydride and glutaconic anhydride; carboxylic acids such as acrylic acid, methacrylic acid, maleic acid, fumaric acid and cinnamic acid; esters such as 2-ethylhydroxyl acrylate and 2-ethylhydroxyl methacrylate; and alcohols such as allyl alcohol. According to this invention these ethylene-propylene copolymers or ethylene-propylene-diene terpolymers modified with unsaturated compounds are used in the polymerization. Such modified polymers include (maleic anhydride)-modified ethylene-propylene copolymer, (maleic anhydride)- modified ethylene-propylene-ethylidenenorbornene terpolymer, (maleic anhydride)-modified ethylene-propylene-dicyclopentadiene terpolymer, (itaconic anhydride)-modified ethylene-propylene copolymer, (acrylic acid)-modified ethylene-propylene copolymer, (methacrylic acid)-modified ethylene-propylene-ethylidenenorbornene terpolymer, (2-ethylhydroxyl acrylate)-modified ethylene-propylene copolymer, (2-ethylhydroxyl methacrylate)-modified ethylene-propylene copolymer and (allyl alcohol)-modified ethylene-propylene copolymer.

Elastomers of the second group are elastomers of the polystyrene type which contain polystyrene as the hard segment. The soft segments in combination with the polystyrene are diene polymers such as polybutadiene and polyisoprene; and hydrogenated diene polymers such as hydrogenated polybutadiene and hydrogenated polyisoprene. According to this invention it is also possible to use elastomers modified with unsaturated compounds, such as (unsaturated compound)-modified polystyrene-polybutadiene block copolymer. For the modification, those unsaturated compounds which are used in modifying elastomers of the polyolefin type are used.

Individual elastomers of the second group include polystyrene-polybutadiene block copolymer, polystyrene-polyisoprene block copolymer, hydrogenated polystyrene-polybutadiene block copolymer, hydrogenated polystyrene-polyisoprene block copolymer, (maleic anhydride)-modified polystyrene polybutadiene block copolymers, (maleic anhydride)-modified hydrogenated polystyrene-polybutadiene block copolymer and (2-ethylhydroxyl methacrylate)-modified hydrogenated polystyrene-polybutadiene block copolymer.

Elastomers of the third group are elastomers of the polyester type which contain an aromatic polyester as the hard segment. The soft segments in combination with the aromatic polyester are aliphatic polyethers and aliphatic polyesters. Individual elastomers of the third group include poly(ethylene terephthalate)-poly(propylene glycol) block copolymer, poly(butylene terephthalate)-poly(tetramethylene glcol) block copolymer, poly(ethylene butylene terephthalate)-poly(tetramethylene glycol) block copolymer; elastomer formed from bis($\beta$-hydroxyethyl)terephthalate, terephthalic acid and poly(tetramethylene glycol); poly(butylene terephthalate)-poly(ethylene adipate) block copolymer and poly(ethylene terephthalate)-poly(butylene succinate) block copolymer.

Elastomers of the fourth group are elastomers of the polyamide type, which contain a polyamide as the hard segment. The soft segments in combination with the polyamide are aliphatic polyethers and aliphatic polyesters. Individual elastomers of the fourth group include nylon 6-poly(propylene glycol) block copolymer (bonded to succinic acid), nylon 6-poly(ethylene adipate) block copolymer, nylon 6-poly(butylene succinate) block copolymer, nylon 6-poly(tetramethylene glycol) block copolymer (bonded to adipic acid), nylon 6,6-poly(propylene glycol) block copolymer (bonded to succinic acid), nylon 6,6-poly(ethylene adipate) block copolymer, nylon 11-poly(tetramethylene glycol) block copolymer (bonded to adipic acid), nylon 11-poly(ethyleneadipate) block copolymer and nylon 12-poly(butylene succinate) block copolymer.

Elastomers of the fifth group are elastomers of the polyurethane type, which contain a polyurethane as the hard segment. The soft segments in combination with the polyurethane are aliphatic polyethers and aliphatic polyesters. Individual elastomers of the fifth group include elastomer formed from 4,4-diphenylmethane diisocyanate, tetramethylene glycol and poly(tetramethylene glycol); elastomer formed from tolylene diisocyanate, propylene glycol and poly(propylene glycol); elastomer formed from 4,4'-dicyclohexylmethane diisocyanate, ethylene glycol and poly(ethylene adipate); elastomer formed from hexamethylene diisocyanate, tetramethylene glycol and poly(butylene succinate), elastomer formed from hexamethylene diisocyanate, ethylene glycol and poly(ethylene succinate); elastomer formed from xylene diisocyanate, succinic acid and poly(ethylene glycol); and elastomer formed from naphthylene diisocyanate, tetramethylene glycol and poly(propylene glycol).

Before being used in polymerization, the elastomer is preferably purified by means of washing, adsorption or drying. The elastomers are used each alone or in mixtures of 2 or more elastomers.

In the homopolymerization according to this invention, thoroughly purified formaldehyde or trioxane is used as the starting material for polyacetal copolymers, while in the copolymerization according to this invention thoroughly purified formaldehyde, trioxane, or a polyoxymethylene and a cyclic ether are used as the starting materials for polyacetal copolymers. The polyoxymethylene is a homopolymer of formaldehyde or trioxane and has a number-average molecular weight of 10,000 to 500,000, preferably 30,000 to 150,000.

Cyclic ethers of the first group are alkylene oxides represented by the general formula

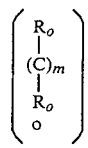

wherein $R_o$'s, which may be the same or different, are selected from hydrogen atom, alkyl groups and phenyl groups and m is an integer of from 2 to 6. Examples are ethylene oxide, propylene oxide, butylene oxide, epichlorohydrin, styrene oxide, oxethane, 3,3-bis(chloromethyl)oxetane, tetrahydrofuran and oxepane. Of these alkylene oxides, particularly preferred is ethylene oxide.

Cyclic ethers of the second group are cyclic formals represented by the general formula

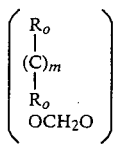

Examples are ethylene glycol formal, propylene glycol formal, diethylene glycol formal, triethylene glycol formal, 1,4-butanediol formal, 1,5-pentanediol formal and 1,6-hexanediol formal. Of these cyclic formals, especially preferred are ethylene glycol formal, diethylene glycol formal and 1,4-butanediol formal.

The cyclic ether is used in an amount of 0.03–100 parts by weight, preferably 0.1–50 parts by weight, for 100 parts by weight of formaldehyde, trioxane or polyoxymethylene.

In general, an anionic polymerization initiator is used for the homopolymerization of formaldehyde and a cationic initiator for the homopolymerization of trioxane. A cationic polymerization initiator or a combination of anionic and cationic initiators is used for the copolymerization of formaldehyde and a cyclic ether. A cationic initiator is generally used for the copolymerization of trioxane and a polyoxymethylene.

The anionic initiators and the cationic initiators suitable for use in the polymerization according to this invention are such compounds as shown below.

Representative groups of anionic initiators are alkali metals such as sodium and potassium alkali metal complexes such as sodium naphthalene and potassium anthracene; alkali metal hydrides such as sodium hydride; alkaline earth metal hydrides such as calcium hydride; alkali metal alkoxides such as sodium methoxide and potassium tert-butoxide; alkali metal carboxylates such as sodium caproate and potassium stearate; alkaline earth metal carboxylates such as magnesium caproate and calcium stearate; amines such as n-butylamine, diethylamine, trioctylamine and pyridine; quaternary ammonium salts such as ammonium stearate, tetrabutylammonium methoxide and dimethyldisterylammonium acetate; phosphonium salts such as tetramethylphosphonium propionate and trimethylbenzylphosphonium ethoxide; or organo(tetravalent)tin compounds such as tributyltin chloride, diethyltin dilaurate and dibutyltin dimethoxide; and metal alkyls such as n-butyllithium and ethylmagnesium chloride.

As cationic initiators mention may be made of so called Friedel-Crafts-type compounds such as tin tetrachloride, tin tetrabromide, titanium tetrachloride, aluminum trichloride, zinc chloride, vanadium trichloride, antimony pentafluoride, boron trifluoride, and boron trifluoride coordination compounds such as boron trifluoride diethyletherate, boron trifluoride acetic anhydrate and boron trifluoride-triethylamine complex; inorganic and organic acids such as perchloric acid, acetyl perchlorate, hydroxyacetic acid, trichloroacetic acid and p-toluenesulfonic acid; complex salt compounds such as triethyloxonium tetrafluoroborate, triphenylmethyl hexafluoroantimonate, aryldiazonium hexafluorophosphate, and aryldiazonium tetrafluoroborate; and metal alkyls such as diethyl zinc, triethylaluminum and diethylaluminum chloride.

The anionic and cationic initiators are used in an amount of 0.0005 to 5 parts by weight for 100 parts of starting materials. The polymerization is carried out in the absence or presence of an organic medium.

The organic media which can be used according to this invention include aliphatic hydrocarbons such as n-pentane, n-hexane, n-heptane, n-octane, cyclohexane and cyclopentane; aromatic hydrocarbons such as benzene, toluene and xylene; halogenated aliphatic hydrocarbons such as methylene chloride, chloroform, carbon tetrachloride, ethylene chloride and trichloroethylene; and halogenated aromatic hydrocarbons such as chlorobenzene, and o-dichlorobenzene. The organic media are used each alone or in mixtures of two or more. The elastomer as molecular weight regulator is used as homogeneous solution or dispersion in the reaction system. The proper concentration of the molecular weight regulator in the reaction system can be easily determined experimentally in accordance with the required molecular weight of an intended polyacetal copolymer.

In the homopolymerization, the polymerization temperature is generally in the range of $-20°$ to $230°$ C., but is preferably in the range of $20°$ to $210°$ C. when no solvent is used and in the range of $-10°$ to $120°$ C. when an organic medium is used.

In the copolymerization, the polymerization temperature is generally in the range of $-70°$ to $230°$ C., but is preferably in the range of $20°$ to $210°$ C. when no solvent is used and in the range of $-10°$ to $120°$ C. when an organic medium is used.

The polymerization time is subject to no special limitation and is generally in the range of from 5 seconds to 300 minutes.

After the lapse of a predetermined time, the polymerization is terminated by the addition of a terminating agent to the reaction system. The resulting polymer is stabilized by removing the labile terminal of the polymer by hydrolysis or by capping the labile terminal by esterification or other means. In practice, the stabilized polyacetal copolymer is used after addition of a stabilizer or other additives.

The novel polyacetal copolymer of this invention is described below in detail.

The polyacetal copolymer of this invention is a block copolymer or a graft copolymer comprising a thermoplastic elastomer portion having a second-order transition temperature of $-120°$ to $40°$ C. and a polyacetal portion. The polyacetal portion includes acetal homopolymer and acetal copolymer. The acetal homopolymer is a polymer consisting of the repetition of oxymethylene unit $-CH_2O-$. The acetal copolymer is a polymer having a structure in which an oxyalkylene unit

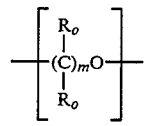

(wherein $R_o$'s, which may be the same or different, are selected from hydrogen atom, alkyl groups and phenyl groups and m is an integer of from 2 to 6) is randomly inserted into a chain of recurring oxymethylene units. The frequency of insertion of the oxymethylene unit in the acetal copolymer is 0.05 to 50, preferably 0.1 to 20, moles per 100 moles of the oxymethylene unit. Examples of oxyalkylene units are oxyethylene unit, oxypropylene unit, oxytrimethylene unit, oxytetramethylene unit, oxybutylene unit and oxyphenylethylene unit. Of these oxyalkylene units, especially preferred are oxyethylene unit $-(CH_2)_2O-$ and oxytetramethylene unit $-(CH_2)_4O-$ from the viewpoint of improving physical properties of the copolymer.

The thermoplastic elastomer portion content of the polyacetal copolymer should be in the range of from 0.5 to 50% by weight. If the content is too low, the toughness of the polymer will not be improved, while if the content is too high, the strength and stiffness of the polymer will be decreased.

The melt index (MI, ASTM D 1238-57T) of the polyacetal copolymer should be in the range of from 0.01 to 70 (g/10 minutes at $190°$ C.). The melt index of a polymer is a measure of molecular weight. The physical properties and processability of the polymer are satisfactory so long as the melt index of the polymer is in the range of from 0.01 to 70 (g/10 minutes).

The structure of the polyacetal copolymer of this invention is confirmed in the following way.

When the polyacetal copolymer is hydrolyzed with a dilute aqueous acidic solution, the portion composed of repeated oxymethylene units is converted into formaldehyde and the portion of oxyalkylene units inserted into the acetal copolymer is converted into alkylene glycol:

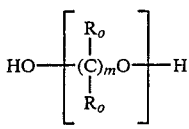

The formaldehyde and alkylene glycol are analyzed and determined by gas chromatography, liquid chromatography or other means. The thermoplastic elastomer portion of the polyacetal copolymer is converted into an elastomer having a functional group owing to the cleavage of the bond between the elastomer and the acetal polymer under the above conditions of hydrolysis. The converted elastomer precipitates out of the aqueous solution and is analyzed and determined by common methods of polymer analysis.

Some examples of polyacetal copolymers of the present invention are shown below in structural formulas.

(1) Diblock copolymer

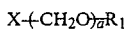  (1-1)

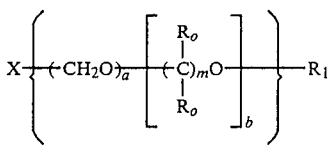  (1-2)

(2) Triblock copolymer

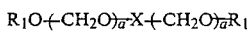  (2-1)

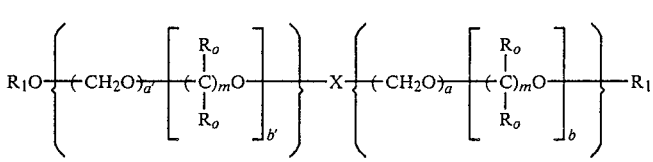  (2-2)

(3) Graft copolymer

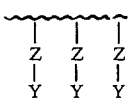  (3-1)

where ∼∼∼ represents an elastomer, Z represents a modifying group, and Y represents an acetal polymer such as, for example, $-CH_2O-{}_aR_1$ or

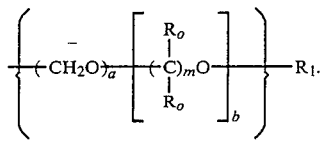

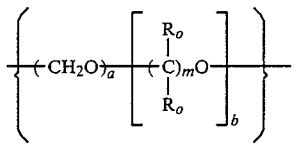

In the above formulas, X represents an elastomer portion, $R_1$'s, which may be the same or different, are selected from hydrogen atom, alkyl groups and phenyl groups; and a, b, a' and b' are each a positive number denoting the number of links in the chain. The formula means that oxyalkylene units, b in total number, are randomly inserted into the oxymethylene units, a in total number, and does not define the distribution of oxyalkylene units in the polymer.

The process for producing polyacetal copolymers according to the present invention described in detail in the foregoing has the following advantages:

(1) The process produces polyacetal copolymers excellent in performance characteristics such as impact resistance, fatigue resistance and others.

(2) By using a specified thermoplastic elastomer, the process makes it possible to impart to the polyacetal copolymer excellent characteristics as well as to regulate freely the molecular weight of the polymer.

In the following Examples the measurements were carried out in the following way:

MI: To 100 parts of the polymers which has been terminally stabilized with acetic anhydride, are added 0.25 part of 2,2-methylene-bis(4-methyl-6-tert-butylphenol) and 0.50 part of nylon 6,6. The mixture is pelletized by means of a 50-mm $\phi$ extruder. MI of the pellets is measured according to the method of ASTM D 1238-57T. MI is a measure of molecular weight.

Izod impact value (notched): The pellets are molded into a plate by means of an injection molding machine. Test specimens are cut out of the molded plate and measured for the impact value according to the method of ASTM D 256. The larger the Izod impact value is, the better is the impact resistance.

Flexural fatigue by constant-amplitude-of-force: Test specimens are cut out of the plate and tested for the flexural fatigue according to the method of ASTM D 671-71 at 20° C. under application of flexural stress of 1,800 cycles/minute. The maximum stress which does not cause failure of the test specimen after $10^6$ cycles of flexural stress have been applied is the fatigue strength which serves as the measure of fatigue resistance. The larger the fatigue strength is, the better is the fatigue resistance.

Tensile strength: Test specimens are cut out of the plate and measured for the tensile strength according to the method of ASTM D 638. The higher the tensile strength is, the better are the strength and stiffness.

EXAMPLE 1

1-1. Preparation of polyacetal copolymer:

Formaldehyde gas, 99.9% pure, was continuously fed at a rate of 100 parts/hour (parts by weight; the same applies hereinafter) for 3 hours into 500 parts of a toluene solution containing 60.2 g/liter of poly(butylene terephthalate)-poly(tetramethylene glycol) block copolymer (hereinafter referred to briefly as PBT-PTG), used as molecular weight regulator, and $3.5 \times 10^{-4}$ mole/liter of dimethyldistearylammonium acetate, used as polymerization intiator. The thermoplastic elastomer used as the molecular weight regulator was a polymer having a hydroxy group and a carboxyl group as end groups and having Tg $-20°$ C., which had been prepared from the following starting materials:

Bis($\beta$-hydroxybutyl)terephthalate,
Terephthalic acid,
Tetramethtylene glycol, and
Poly(tetramethylene glycol) ($\overline{M_n} = 1250$).

Simultaneously with the feeding of formaldehyde gas, into the reactor was fed continuously at a rate of 500 parts/hour for 3 hours the same toluene solution containing PBT-PTG and initiator in the same concentrations as used above, while the polymerization temperature being maintained at 62° C.

The polymerization products were separated from the toluene, then washed and dried to yield 398 parts of a polymer. The polymer was acetylated and extracted with benzyl alcohol at 160° C. for 5 hours. None of the unreacted PBT-PTG was found in the extract. From this fact it has become apparent that all of the PBT-PTG had been inserted into the polymer.

1-2. Confirmation of the structure of polyacetal copolymer:

Five parts of the polymer obtained in 1-1 were dispersed in 95 parts of 0.3N hydrochloric acid and the dispersion was heated at 80° C. for 3 hours. After the hydrolytic treatment, it was found that all of the polyacetal portions consisting of oxymethylene chains had reverted to formaldehyde. As contrasted, the PBT-PTG had been hydrolyzed to only a slight extent. The aqueous acidic solution was neutralized with 0.5N aqueous sodium hydroxide solution and the precipitated elastomer was separated and dried to recover 1.75 parts of the elastomer.

The polymer obtained in 1-1 was acetylated and the analysis and quantitative determination of the end groups were performed by infra-red absorption spectroscopy. It was found that all of the end groups are acetyl groups and the molar ratio of acetyl group to $CH_2O$-chain was $153 \times 10^{-5}$.

From the above results it is concluded that the polymer obtained in 1-1 has the following structure:

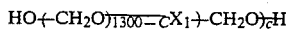 (A)

wherein $X_1$ is PBT-PTG and consists of the following soft and hard segments:

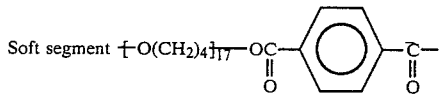

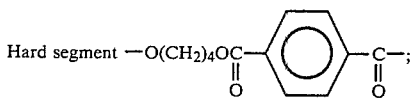

and C is 1 to 1299. The elastomer portion content of the polymer was 35% by weight.

1-3. Measurement of physical properties of the polyacetal copoymer:

After completion of the end group stabilization with acetic anhydride, the polymer was incorporated with a stabilizer and molded to obtain a molded product having a high toughness, which showed the following physical properties:

| MI | 7.1 (g/10 minutes) |
| Izod impact value | 48 (kg · cm/cm) |
| Fatigue strength | 260 (kg/cm²) |
| Tensile strength | 550 (kg/cm²) |

As evidenced by the above results, the copolymer is not only of an intended molecular weight but also excellent in impact resistance, fatigue resistance, and strength.

EXAMPLE 2

2-1. Preparation of polyacetal copolymer:

Formaldehyde and ethylene oxide were continuously fed at the rates of 100 parts/hour and 2.2 parts/hour, respectively, for 5 hours into 500 parts of a toluene solution containing 64 g/liter of a nylon 6-polypropylene block copolymer (hereinafter referred to briefly as NY-PPG), used as molecular weight regulator. The thermoplastic elastomer used as the molecular weight regulator was a polymer having one terminal amino group and having Tg $-10°$ C., which had been prepared from the following starting materials:

A prepolymer formed by the reaction between poly(propylene glycol) and adipic acid ($\overline{M_N} = 1,550$)
$\epsilon$-Caprolactam polymer (nylon 6; $\overline{M_N} = 1,170$).

Simultaneously with the feeding of formaldehyde, into the reactor was fed continuously at a rate of 500 parts/hour the same toluene solution containing NY-PPG in the same concentration as used above. Into the reactor, were also continuously fed tetrabutylammonium acetate and boron trifluoride dibutyl etherate, both used as polymerization initiators, at the rates of 0.03 part/hour and 0.08 part/hour, respectively, through separate conduits for 5 hours. The polymerization temperature was maintained at 60° C. throughout the reaction time.

The polymerization products were separated from the toluene, then washed and dried to yield 690 parts of a polymer. The polymer was acetylated and extracted with benzyl alcohol at 160° C. for 5 hours. None of the unreacted NY-PPG was found in the extract. From this fact it has become apparent that all of the NY-PPG had been inserted into the polymer.

2-2. Confirmation of the structure of polyacetal copolymer:

Upon hydrolysis of the polymer obtained in 2-1 under the same conditions as in Example 1, the ratio of insertion of the oxyethylene unit into the polymer was found to be 1.50 moles per 100 moles of $CH_2O$-chain. As contrasted, the NY-PPG was hydrolyzed to only a slight extent. In a manner similar to that in Example 1, 1.3 parts of the elastomer were recovered from the aqueous solution.

After acetylation, the polymer obtained in 2-1 was subjected to analysis and quantitative determination of the end groups. The ratio of total end group to $CH_2O$-chain was found to be $171 \times 10^{-5}$ mole/mole.

From the above results it is concluded that the polymer obtained in 2-1 has the following structure:

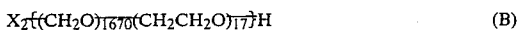

wherein $X_2$ is NY-PPG and consists of the following soft and hard segments:

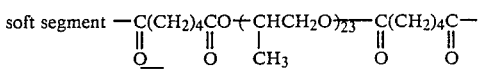

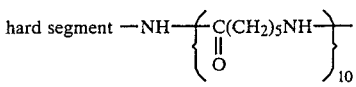

The elastomer portion content of the polymer was 26% by weight.

2-3. Measurement of physical properties of the polyacetal copolymer:

The polymer obtained in 2-2 showed the following physical properties:

| | |
|---|---|
| MI | 9.3 (g/10 minutes) |
| Izod impact value | 38 (kg · cm/cm) |
| Fatigue strength | 230 (kg/cm²) |
| Tensile strength | 520 (kg/cm²) |

This polymer also possessed an intended molecular weight and a high impact resistance as well as a high strength.

EXAMPLE 3

3-1. Preparation of polyacetal copolymer:

Formaldehyde gas was continuously fed at a rate of 100 parts/hour for 3 hours into 500 parts of a toluene solution containing 60 g/liter of (2-ethylhydroxyl methacrylate)-modified ethylene-propylene copolymer (hereinafter referred to briefly as HEMA-EPM) used as molecular weight regulator, and $2.5 \times 10^{-4}$ mole/liter of dimethyldistearylammonium acetate, used as polymerization initiator.

The elastomer employed in the present Example was a polymer prepared by treating a mixture of an ethylene-propylene copolymer, 2-ethylhydroxyl methacrylate and dicumyl peroxide in a 30-mm extruder at 225° C. to effect modification. The resulting elastomer, which has 3 hydroxyl groups on the average in each molecule and Tg −60° C., showed a MI of 5.8 (g/10 minutes).

Simultaneously with the feeding of formaldehyde gas at a rate of 100 parts/hour, into the reactor was fed continuously for 3 hours at a rate of 500 parts/hour the toluene solution containing 60 g/liter of HEMA-EPM and $2.5 \times 10^{-4}$ mole/liter of dimethyldistearylammonium acetate, while maintaining the polymerization temperature at 60° C. The toluene medium containing the polymerization products was continuously withdrawn at a rate corresponding to the feeding rate. The polymer was collected by filtration, washed thoroughly with hot xylene and dried in vacuo at 60° C. to obtain 361 parts of a white polymer.

3-2. Confirmation of the structure of polyacetal copolymer:

Five parts of the polymer obtained in 3-1 were dispersed in 95 parts of 0.3N aqueous hydrochloric acid and the dispersion was heated at 98° C. for 3 hours. After the heat treatment, it was found that all of the polyacetal portions consisting of oxymethylene chains had reverted to formaldehyde. As contrasted, the HEMA-EPM portion did not undergo the decomposition. The aqueous acidic solution was neutralized with 0.5N aqueous sodium hydroxide solution and the precipitated elastomer was separated and recovered 1.3 parts of the elastomer which showed a MI of 5.8 (g/10 minutes), a value which is the same as the MI of the elastomer employed above in 3-1.

The polymer obtained in 3-1 was acetylated and the analysis and quantitative determination of the end groups were performed by infrared absorption spectroscopy. It was found that all of the end groups were acetyl groups and the molar ratio of acetyl group to $CH_2O$-chain was $75 \times 10^{-5}$. As a consequence, it has become apparent that $\overline{M}_N$ of the acetal copolymer obtained in 3-1 was $4.0 \times 10^4$.

From the above results it is concluded that the polymer obtained in 3-1 has the structure in which three acetal polymer molecules (containing the modifying group) of the following formula had grafted onto the ethylene-propylene copolymer molecule.

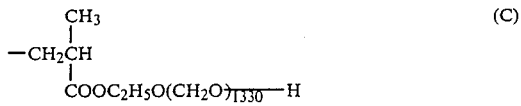

The elastomer-portion content of the polyacetal copolymer was 25% by weight.

3-3. Measurement of physical properties of the polyacetal copolymer:

After completion of the end group stabilization with acetic anhydride, the polymer was incorporated with a stabilizer and molded to obtain a molded article which showed a high toughness and the following physical properties:

| | |
|---|---|
| MI | 0.5 (g/10 minutes) |
| Izod impact value | 38 (kg · cm/cm) |
| Fatigue strength | 240 (kg/cm²) |
| Tensile strength | 540 (kg/cm²) |

As described above, the polyacetal copolymer showed an intended molecular weight and well-balanced physical properties, being excellent in impact resistance and fatigue resistance and low in the loss of tensile strength.

EXAMPLE 4

4-1. Preparation of polyacetal copolymer:

Into a reactor, were charged 5.02 kg of polyoxyethylene dihydroxide, which had been thoroughly dried under reduced pressure, 420 g of ethylene glycol formal, 4.42 kg of (allyl alcohol)-modified ethylene-propylene-ethylidene nobornene terpolymer (hereinafter referred to briefly as AA-EPDM), used as molecular weight regulator, and 50 kg of hexane. The elastomer used as molecular weight regulator is a polymer prepared by treating a mixture of ethylene-propylene-ethylidene norbornene terpolymer, allyl alcohol and dicummyl peroxide in a 30-mm$\phi$ extruder at 230° C. to effect modification. The elastomer, which had 4 hydroxyl groups on the average in each molecule and Tg $-20°$ C., showed a MI of 2.7 (g/10 minutes). After completion of the charge, the contents of the reactor were heated to a temperature of 70° C. The reaction was started by the addition of 1.25 g of boron trifluoride dibutyl-etherate into the reactor. After maintaining the internal temperature of the reactor at 70° C. for 32 minutes, 550 g of cyclohexane containing 130 g of tributylamine was added to the reactor to terminate the reaction. The polymerization products were collected by filtration, washed 5 times with a large volume of methanol to obtain 9.60 kg of a polymer. The polymer was extracted with hot xylene, but none of the AA-EPDM was detectable in the extract, indicating that all of the AA-EPDM had been inserted into the polymer.

4-2. Confirmation of the structure of polyacetal copolymer:

Upon hydrolysis of the polymer obtained in 4-1 under the same conditions as in Example 1, the ratio of insertion of the oxyethylene unit into the polymer was found to be 1.53 moles per 100 moles of $CH_2O$-chain. In a manner similar to that in Example 1, 2.3 parts of the elastomer were recovered from the aqueous solution. The recovered elastomer showed a MI of 2.7 (g/10 minutes) which corresponds to the molecular weight of the elastomer used as molecular weight regulator.

After acetylation, the polymer obtained in 4-1 was subjected to quantitative analysis of end groups. The ratio of total end group to $CH_2O$-chain was found to be $375 \times 10^{-5}$ mole/mole. It has become apparent from the result that $\overline{M}_N$ of the polyacetal portion of the polymer obtained in 4-1 is $8.0 \times 10^3$.

From the above results it is concluded that the polymer obtained in 4-1 has the structure in which 4 molecules of acetal polymer (containing the modifying group) of the following formula were grafted onto the ethylene-propylene-ethylidene norbornene terpolymer.

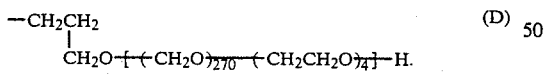
(D)

The elastomer portion content of the polyacetal copolymer was 47% by weight.

4-3. Measurement of physical properties of the polyacetal copolymer:

The polymer obtained in 4-1 had the following physical properties:

| MI | 0.7 (g/10 minutes) |
| Izod impact value | 62 (kg · cm/cm) |
| Fatigue strength | 235 (kg/cm$^2$) |
| Tensile strength | 470 (kg/cm$^2$) |

The polyacetal copolymer had an intended molecular weight and was excellent in impact resistance and fatigue resistance.

EXAMPLE 5

5-1. Preparation of polyacetal copolymer:

Into a kneader with double sigma-blades, were charged 500 parts of thoroughly purified trioxane, 10 parts of ethylene oxide and 120 parts of hydrogenated polystyrene-polybutadiene block copolymer (hereinafter referred to briefly as HPS-PB), used as molecular weight regulator. The mixture was heated at 70° C. After addition of 0.35 part of boron trifluoride dibutyl etherate, the mixture was kneaded for 35 minutes. After 35 minutes, 15 parts of tributylamine was added to terminate the reaction. The contents were discharged from the kneader, then washed thoroughly with hot xylene and dried to obtain 518 parts of a polymer.

The elastomer employed in the present Example was a polymer prepared by hydrogenating a polystyrene-polybutadiene block copolymer formed by the living polymerization technique, and had one terminal hydroxyl group and Tg $-70°$ C.

5-2. Confirmation of the structure of polyacetal copolymer.

Upon hydrolysis of the polymer obtained in 5-1, the degree of insertion of the oxyethylene unit into the polymer was found to be 1.50 moles per 100 moles of $CH_2O$-chain. From the aqueous solution, there were recovered 1.2 parts of the elastomer. The end group analysis of the polymer obtained in 5-1 revealed that the ratio of total end group to $CH_2O$-chain is $133 \times 10^{-5}$ mole/mole.

From the above results, it is concluded that the polymer obtained in 5-1 is a diblock copolymer of the following structure:

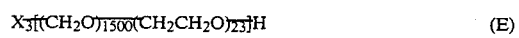
(E)

wherein $X_3$ is HPS-PB and consists of the following soft segment units and hard segment units:

soft segment unit $-(CH_2CH_2CH_2CH_2)-(CH_2CH)-$
$\phantom{soft segment unit -(CH_2CH_2CH_2CH_2)-(CH_2CH)xxxx}|$
$\phantom{soft segment unit -(CH_2CH_2CH_2CH_2)-(CH_2CH)xxx}C_2H_5$ hard segment unit 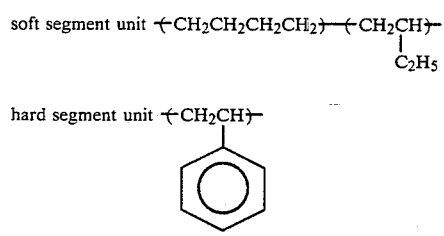

The elastomer portion content of the polyacetal copolymer was 23% by weight.

5-3. Measurement of physical properties of the polyacetal copolymer:

The polymer obtained in 5-1 showed the following physical properties:

| MI | 5.2 (g/10 minutes) |
| Izod impact value | 25 (kg · cm/cm) |
| Fatigue strength | 230 (kg/cm$^2$) |
| Tensile strength | 490 (kg/cm$^2$) |

The polyacetal copolymer had an intended molecular weight and was excellent in impact resistance.

COMPARATIVE EXAMPLE 1 (THE METHOD OF U.S. PAT. NO. 3,218,295)

The procedure of Example 1 was repeated, except that 15.0 g/liter of poly(tetramethylene glycol) was used in place of the thermoplastic elastomer. There were obtained 320 parts of a polymer which showed the following physical properties:

| | |
|---|---|
| MI | 7.3 (g/10 minutes) |
| Izod impact value | 8.2 (kg · cm/cm) |
| Fatigue strength | 180 (kg/cm$^2$) |
| Tensile strength | 320 (kg/cm$^2$) |

The Izod impact value of this polymer was somewhat improved, but the fatigue strength, tensile strength and stiffness thereof were very poor.

A polyoxymethylene of the formula $$HO{+}CH_2O\overline{)_{1300}}H \qquad (F)$$

prepared by using formaldehyde as starting material and water as molecular weight regulator showed the following properties:

| | |
|---|---|
| MI | 9.5 (g/10 minutes) |
| Izod impact value | 6.7 (kg · cm/cm) |
| Fatigue strength | 330 (kg/cm$^2$) |
| Tensile strength | 720 (kg/cm$^2$) |

COMPARATIVE EXAMPLE 2 (THE METHOD OF U.S. PAT. NO. 3,346,663)

The procedure of Example 5 was repeated, except that 80 parts of polyethylene glycol were used in place of the thermoplastic elastomer. There were obtained 260 parts of a polymer which showed the following physical properties:

| | |
|---|---|
| MI | 5.3 (g/10 minutes) |
| Izod impact value | 4.0 (kg · cm/cm) |
| Fatigue strength | 150 (kg/cm$^2$) |
| Tensile strength | 265 (kg/cm$^2$) |

The impact resistance of the polymer was poor and the declines in strength and stiffness represented by tensile strength are very large.

A polyoxymethylene of the formula $$HO{+}(CH_2O)_{1510}(CH_2CH_2O)_{23}{+}H \qquad (G)$$

formed by using trioxane and ethylene oxide as starting materials and water as molecular weight regulator showed the following physical properties:

| | |
|---|---|
| MI | 9.0 (g/10 minutes) |
| Izod impact value | 4.9 (kg · cm/cm) |
| Fatigue strength | 260 (kg/cm$^2$) |
| Tenslie strength | 630 (kg/cm$^2$) |

EXAMPLES 6 TO 51

Polyacetal copolymers were prepared from the starting materials and the thermoplastic elastomers shown in Table 1. All of these copolymers were novel polymers. In Table 1 are also shown physical properties of these polymers.

As is apparent from Table 1, all of the polymers showed a predetermined molecular weight and were excellent in impact resistance. All of the polymers retain a high strength and a high stiffness and are characterized by the well-balanced physical properties.

COMPARATIVE EXAMPLES 3 TO 6 (THE METHOD OF U.S. PAT. NO. 3,218,295)

Block copolymers were prepared from formaldehyde and polymers shown in Table 1. Physical properties of these block copolymers were as shown in Table 2. The block copolymer formed from formaldehyde and a polymer having simple active hydrogen atom is not sufficiently improved in impact resistance and, moreover, shows marked decline in strength and stiffness which are represented by the tensile strength.

COMPARATIVE EXAMPLES 7 TO 9 (METHODS OF U.S. PAT. NOS. 3,925,505 AND 3,872,182)

Copolymers were prepared by polymerizing trioxane and ethylene oxide in the presence of polymers shown in Table 3 in which are also shown physical properties of the resulting copolymers. The copolymers obtained by these methods were poor in impact resistance and, in addition, showed a large decline in strength and stiffness.

TABLE 1

| Example No. | Starting material | Thermoplastic elastomer (functional group and Tg) | MI (g/10 min.) | Izod impact value (kg · cm/cm) | Fatigue strength (kg/cm$^2$) | Tensile strength (kg/cm$^2$) |
|---|---|---|---|---|---|---|
| 6 | Formaldehyde | (Allyl alcohol)-modified, ethylene-propylene copolymer (5 hydroxyl groups) −30° C. | 0.5 | 65 | 260 | 510 |
| 7 | " | (Maleic anhydride)-modified ethylene-propylene-dicyclopentadiene terpolymer (10 carboxylic anhydride groups) −45° C. | 0.3 | 60 | 255 | 520 |
| 8 | " | (Itaconic anhydride)-modified ethylene-propylene copolymer (3 carboxylic anhydride groups) −35° C. | 0.3 | 48 | 265 | 530 |
| 9 | " | (2-Ethylhydroxyl acrylate)-modified ethylene-propylene copolymer (4 hydroxyl groups) −27° C. | 1.2 | 39 | 265 | 550 |
| 10 | " | (2-Ethylhydroxyl methacrylate)-modified ethylene- | 0.08 | 79 | 240 | 470 |

TABLE 1-continued

| Example No. | Starting material | Thermoplastic elastomer (functional group and Tg) | MI (g/10 min.) | Izod impact value (kg·cm/cm) | Fatigue strength (kg/cm²) | Tensile strength (kg/cm²) |
|---|---|---|---|---|---|---|
| | | propylene copolymer (~10 hydroxyl groups) −18° C. | | | | |
| 11 | " | Polystyrene-polybutadiene block copolymer (1 carboxyl group) −40° C. | 5.2 | 25 | 260 | 545 |
| 12 | " | Polystyrene-polybutadiene block copolymer (2 hydroxyl groups) −48° C. | 4.7 | 30 | 260 | 540 |
| 13 | " | Hydrogenated polystyrene-polybutadiene block copolymer (1 hydroxyl group) −108° C. | 3.8 | 35 | 260 | 540 |
| 14 | " | Hydrogenated polystyrene-polyisoprene block copolymer (1 carboxyl group) −90° C. | 4.1 | 28 | 255 | 530 |
| 15 | " | (Maleic anhydride)-modified hydrogenated polystyrene-polyisoprene block copolymer (5 carboxylic anhydride groups) −80° C. | 0.4 | 25 | 250 | 520 |
| 16 | " | (2-Ethylhydroxyl methacrylate)-modified hydrogenated polystyrene-polybutadiene block copolymer (5 hydroxyl groups) −68° C. | 0.3 | 41 | 250 | 530 |
| 17 | " | Poly(ethylene terephthalate)-poly(propylene glycol) block copolymer (1 hydroxyl group, 1 carboxyl group) −10° C. | 10.7 | 28 | 260 | 530 |
| 18 | " | Poly(ethylene butylene terephthalate)-poly(tetramethylene glycol) block copolymer (2 hydroxyl groups) −33° C. | 10.7 | 48 | 250 | 520 |
| 19 | " | Elastomer formed from bis-(β-hydroxyethyl) terephthalate, terephthalic acid and poly(tetramethylene glycol) (1 hydroxyl group, 1 carboxyl group) −23° C. | 9.7 | 40 | 260 | 540 |
| 20 | " | Poly(butylene terephthalate)-poly(ethylene adipate) block copolymer (2 carboxyl groups) −8° C. | 12.1 | 35 | 260 | 535 |
| 21 | " | Poly(ethylene terephthalate)-poly(butylene succinate) block copolymer (1 hydroxyl group) −30° C. | 23.5 | 18 | 280 | 570 |
| 22 | " | Nylon 6-poly(propylene glycol) block copolymer (1 hydroxyl group, 1 amino group) 5° C. | 28.2 | 17 | 290 | 565 |
| 23 | " | Nylon 6-poly(ethylene adipate) block copolymer (1 hydroxyl group) 12° C. | 15.0 | 22 | 270 | 560 |
| 24 | " | Nylon 6-poly(tetramethylene glycol) block copolymer (1 hydroxyl group, 1 carboxyl group) −13° C. | 6.3 | 25 | 260 | 535 |
| 25 | " | Nylon 66-poly(propylene glycol) block copolymer (2 hydroxyl groups) −27° C. | 4.3 | 28 | 255 | 530 |
| 26 | " | Nylon 11-poly(ethylene adipate) block copolymer (1 carboxyl group, 1 amino group) −3° C. | 3.7 | 28 | 250 | 540 |
| 27 | " | Nylon 12-poly(butylene succinate) block copolymer (1 hydroxyl group, 1 amino group) −42° C. | 3.2 | 25 | 255 | 540 |
| 28 | " | Elastomer formed from 4,4'-diphenylmethane diisocyanate, tetramethylene glycol and poly(tetramethylene glycol) (1 hydroxyl group, 1 carboxyl group) −30° C. | 5.3 | 85 | 250 | 505 |
| 29 | " | Elastomer formed from tolylene diisocyanate, pro- | 0.08 | 82 | 240 | 490 |

TABLE 1-continued

| Example No. | Starting material | Thermoplastic elastomer (functional group and Tg) | MI (g/10 min.) | Izod impact value (kg·cm/cm) | Fatigue strength (kg/cm²) | Tensile strength (kg/cm²) |
|---|---|---|---|---|---|---|
| | | pylene glycol and poly(propylene glycol) (1 hydroxyl group, 1 amino group) −66° C. | | | | |
| 30 | " | Elastomer formed from 4,4'-dicyclohexylmethane diisocyanate, ethylene glycol and poly(tetramethylene glycol) (2 hydroxyl groups) −19° C. | 0.3 | 65 | 250 | 520 |
| 31 | " | Elastomer formed from hexamethylene diisocyanate, ethylene glycol and poly(ethylene succinate) (1 carboxyl group, 1 amino group) −40° C. | 0.7 | 60 | 250 | 490 |
| 32 | " | Elastomer formed from xylene diisocyanate, succinic acid and poly(ethylene glycol) (2 hydroxyl groups) 2° C. | 0.5 | 63 | 250 | 490 |
| 33 | " | Elastomer formed from naphthalene diisocyanate, tetramethylene glycol and poly(propylene glycol) (1 hydroxyl group, 1 carboxyl group) −53° C. | 1.5 | 60 | 250 | 485 |
| 34 | Trioxane | (Maleic anhydride)-modified ethylene-propylene copolymer (10 carboxylic anhydride groups) −63° C. | 1.2 | 35 | 260 | 535 |
| 35 | " | (Methacrylic acid)-modified ethylene-propylene-ethylidenenorbornene terpolymer (3 carboxyl groups) −28° C. | 1.8 | 30 | 260 | 540 |
| 36 | " | Polystyrene-polybutadiene block copolymer (1 hydroxyl group) −78° C. | 10.2 | 25 | 265 | 540 |
| 37 | Trioxane, ethylene oxide | Poly(ethylene butylene terephthalate)-poly(tetramethylene glycol) block copolymer (1 hydroxyl group, 1 carboxyl group) 21° C. | 3.7 | 28 | 245 | 480 |
| 38 | Trioxane, ethylene oxide | Nylon 11-poly(tetramethylene glycol) block copolymer (1 amino group) 8° C. | 3.2 | 18 | 240 | 490 |
| 39 | Trioxane, ethylene oxide | Elastomer formed from 4,4'-diphenylmethane diisocyanate, tetramethylene glycol and poly(tetramethylene glycol) (1 hydroxyl group, 1 carboxyl group) −10° C. | 2.5 | 21 | 255 | 490 |
| 40 | Formaldehyde, 1,4-butanediol formal | (Maleic anhydride)-modified ethylene-propylene copolymer (5 carboxylic anhydride groups) −47° C. | 1.8 | 35 | 245 | 490 |
| 41 | Formaldehyde, ethylene glycol formal | Hydrogenated polystyrene-polybutadiene block copolymer (2 hydroxyl groups) −90° C. | 15.4 | 25 | 250 | 500 |
| 42 | Formaldehyde, diethylene glycol formal | Poly(butylene terephthalate)-poly(tetramethylene glycol) block copolymer (1 hydroxyl group, 1 carboxyl group) −3° C. | 34.7 | 18 | 250 | 505 |
| 43 | Trioxane, 1,5-pentanediol formal | Nylon 6-poly(tetramethylene glycol) block copolymer (1 amino group) 13° C. | 35.2 | 13 | 230 | 465 |
| 44 | Trioxane, 1,4-butanediol formal | Nylon 6-poly(ethylene adipate) block copolymer (1 hydroxyl group, 1 amino group) 17° C. | 68.5 | 15 | 250 | 510 |
| 45 | Trioxane, diethylene glycol formal | Elastomer formed from 4,4'-diphenylmethane diisocyanate, tetramethylene glycol and poly(tetramethylene glycol) (1 hydroxyl group, 1 carboxyl group) −8° C. | 2.7 | 44 | 250 | 480 |
| 46 | Trioxane, ethylene glycol formal | Elastomer formed from 4,4'-dicyclohexylmethane diisocyanate, ethylene glycol | 2.5 | 40 | 250 | 485 |

TABLE 1-continued

| Example No. | Starting material | Thermoplastic elastomer (functional group and Tg) | MI (g/10 min.) | Izod impact value (kg·cm/cm) | Fatigue strength (kg/cm²) | Tensile strength (kg/cm²) |
|---|---|---|---|---|---|---|
| | | and poly(ethylene adipate) (1 hydroxyl group, 1 carboxyl group) −25° C. | | | | |
| 47 | Trioxane, butylene oxide | Elastomer formed from xylene diisocyanate, succinic acid and poly(ethylene glycol) (1 carboxyl group) −35° C. | 2.0 | 20 | 230 | 470 |
| 48 | Trioxane, propylene oxide | (2-Ethylhydroxyl acrylate)-modified ethylene-propylene copolymer (∼10 hydroxyl groups) −48° C. | 15.2 | 30 | 225 | 475 |
| 49 | Polyoxymethylene, 1,4-butanediol formal | (Maleic anhydride)-modified hydrogenated polystyrene-polybutadiene block copolymer (5 carboxylic anhydride groups) −62° C. | 0.2 | 33 | 240 | 475 |
| 50 | Polyoxymethylene diethylene glycol formal | Poly(ethylene butylene terephthalate)-poly(tetramethylene glycol) block copolymer (1 hydroxyl group) 25° C. | 10.1 | 23 | 250 | 490 |
| 51 | Polyoxymethylene ethylene glycol formal | Nylon 6-poly(ethylene adipate) block copolymer (1 amino group) 6° C. | 13.4 | 25 | 255 | 490 |

TABLE 2

| Comparative Example No. | Polymer | MI (g/10 min.) | Izod impact value (kg·cm/cm) | Fatigue strength (kg/cm²) | Tensile strength (kg/cm²) |
|---|---|---|---|---|---|
| 3 | Vinyl acetate-crotonic acid copolymer | 8.3 | 8.5 | 172 | 310 |
| 4 | Poly(ethylene glycol) | 6.2 | 7.3 | 165 | 280 |
| 5 | Vinyl acetate-allyl acetate copolymer | 2.7 | 7.0 | 136 | 270 |
| 6 | Poly(propylene glycol) | 2.5 | 5.8 | 185 | 320 |

TABLE 3

| Comparative Example No. | Polymer | MI (g/10 min.) | Izod impact value (kg·cm/cm) | Fatigue strength (kg/cm²) | Tensile strength (kg/cm²) |
|---|---|---|---|---|---|
| 7 | Ethylene oxide-tetrahydrofuran copolymer | 3.5 | 4.6 | 185 | 250 |
| 8 | Poly(1,3-dioxolane) | 2.5 | 4.8 | 190 | 250 |
| 9 | Poly(vinyl acetate) | 41.8 | 5.1 | 185 | 255 |

COMPARATIVE EXAMPLE 10 (EXAMPLE OF THE CASE WHERE A THERMOPLASTIC ELASTOMER HAVING NO FUNCTIONAL GROUP IS USED)

The procedure of Example 1 was repeated, except that 50.8 g/liter of an ethylene-propylene copolymer (Tg, −48° C.) having no functional group was used in place of the thermoplastic elastomer. There was obtained 358 parts of a polymer. When the polymer was washed with hot xylene, 152 parts of the ethylene-propylene copolymer were detected from the hot xylene solution.

The polymer insoluble in hot xylene had the following structure:

   (H)

where $C \approx 1 \times 10^4$.

From the above results, it has become apparent that an ethylene-propylene copolymer having no functional group does not function as a molecular weight regulator.

The polyoxymethylene having the structure represented by the formula (H) showed the following physical properties:

| MI | ≦0.01 (g/10 minutes) |
|---|---|
| Izod impact value | 7.2 (kg·cm/cm) |
| Fatigue strength | 350 (kg/cm²) |
| Tensile strength | 705 (kg/cm²) |

A mixture of polyoxymethylene having the structure represented by (H) and ethylene-propylene copolymer showed the following physical properties:

| MI | 0.1 (g/10 minutes) |
|---|---|
| Izod impact value | 8.6 (kg·cm/cm) |
| Fatigue strength | 190 (kg/cm²) |
| Tensile strength | 280 (kg/cm²) |

COMPARATIVE EXAMPLE 11 (EXAMPLE OF THE CASE WHERE MI OF THE COPOLYMER IS MORE THAN 70 G/10 MINUTES)

The procedure of Example 1 was repeated, except that a nylon 6-poly(propylene glycol) block copolymer (2 hydroxyl groups, Tg −28° C.) of a low degree of polymerization in a concentration of 250.7 g/liter was used in place of the thermoplastic elastomer. There were obtained 850 parts of a polymer.

Physical properties of this polymer were very poor as shown below:

| MI | 85 (g/10 minutes) |
|---|---|
| Izod impact value | 6.2 (kg · cm/cm) |
| Fatigue strength | 105 (kg/cm$^2$) |
| Tensile strength | 115 (kg/cm$^2$) |

COMPARATIVE EXAMPLE 12 [EXAMPLE OF THE CASE WHERE MI OF THE COPOLYMER IS 0.01 (G/10 MINUTE) OR LESS]

The procedure of Example 1 was repeated, except that 5.2 g/liter of a polystyrene-polyisoprene block copolymer (1 hydroxyl group; Tg −60° C.) of a high degree of polymerization was used in place of the thermoplastic elastomer. There were obtained 268 parts of a polymer.

Being too low in MI, the resulting polymer could not be molded by means of a common injection molding machine. The MI of the polymer was 0.01 (g/10 minutes) or less.

What is claimed is:

1. A polyacetal copolymer composed of an acetal polymer portion and a thermoplastic elastomer portion having soft segments and hard segments, the second-order transition temperature of said elastomer portion being in the range of from −120° to 40° C.

2. A copolymer according to claim 1, wherein the acetal polymer portion is an acetal homopolymer consisting of recurring oxymethylene units ﹢CH$_2$O﹢.

3. A copolymer according to claim 1, wherein the acetal polymer portion has a structure in which oxyalkylene units

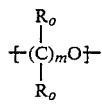

(where R$_o$'s, which may be the same or different, are selected from hydrogen atom, alkyl groups and phenyl groups and m is an integer of from 2 to 6) are randomly inserted into a chain of oxymethylene units.

4. A copolymer according to claim 1, wherein the melt index of the polyacetal copolymer is in the range of from 0.01 to 70 (g/10 minutes at 190° C.).

5. A copolymer according to claim 1, wherein the thermoplastic elastomer portion content of the polyacetal copolymer is in the range of from 0.5 to 50% by weight.

6. A copolymer according to claim 1, wherein the thermoplastic elastomer is selected from elastomers of a polyolefin which contains polyolefin as the hard segment, elastomers of a polystyrene which contains polystyrene as the hard segment, elastomers of a polyester which contains polyester as the hard segment, elastomers of a polyamide which contains polyamide as the hard segment, and elastomers of a polyurethane which contains polyurethane as the hard segment.

7. A copolymer according to claim 6, wherein the elastomer of the polyolefin which contains polyolefin as the hard segment is an (unsaturated compound)-modified ethylene-propylene copolymer or an (unsaturated compound)-modified ethylene-propylene-diene terpolymer.

8. A copolymer according to claim 6, wherein the elastomer of the polystyrene which contains polystyrene as the hard segment is selected from polystyrene-polybutadiene block copolymers, hydrogenated polystyrene-polybutadiene block copolymers, (unsaturated compound)-modified polystyrene-polybutadiene block copolymers and (unsaturated compound)-modified hydrogenated polystyrene-polybutadiene block copolymers.

9. A copolymer according to claim 6, wherein the elastomer of the polyester which contains polyester as the hard segment is a poly(butylene terephthalate)-poly(tetramethylene glycol) block copolymer or a poly(ethylene butylene terephthalate)-poly(tetramethylene glycol) block copolymer.

10. A copolymer according to claim 6, wherein the elastomer of the polyamide which contains polyamide as the hard segment is a nylon 6-poly(propylene glycol) block copolymer or a nylon 6-poly(tetramethylene glycol) block copolymer.

11. A copolymer according to claim 6, wherein the elastomer of the polyurethane which contains polyurethane as the hard segment is a polyurethane formed from 4,4-diphenylmethane diisocyanate, tetramethylene glycol and poly(tetramethylene glycol).

12. A process for producing a polyacetal copolymer, which comprises homopolymerizing formaldehyde or trioxane or copolymerizing a compound selected from formaldehyde, trioxane and polyoxymethylenes with a cyclic ether in the presence of a thermoplastic elastomer having soft segments and hard segments and at least one functional group selected from hydroxyl group, carboxyl group, carboxylic anhydride groups and amino group, the second order transition temperature of said elastomer being in the range of from −120° to 40° C.

13. A process according to claim 12, wherein the cyclic ether is ethylene oxide.

14. A process according to claim 12, wherein the cyclic ether is a compound selected from ethylene glycol formal, diethylene glycol formal and 1,4-butanediol formal.

15. A process according to claim 12, wherein the homopolymerization of formaldehyde or trioxane is carried out at a temperature in the range of from −20° to 230° C.

16. A process according to claim 12, wherein the copolymerization of a compound selected from formaldehyde, trioxane and polyoxymethylenes with the cyclic ether is carried out at a temperature in the range of from −70° to 230° C.

17. A copolymer according to claim 3, wherein the oxyalkylene unit is an oxyethylene unit —(CH$_2$)$_2$O—.

18. A copolymer according to claim 3, wherein the oxyalkylene unit is an oxytetramethylene unit —(CH$_2$)$_4$O—.

* * * * *